Sept. 23, 1952 G. H. COULTER 2,611,857
COMBINED VEHICLE HEAD-LIGHTING AND TURN ILLUMINATING SYSTEM
Original Filed May 8, 1947 3 Sheets-Sheet 1
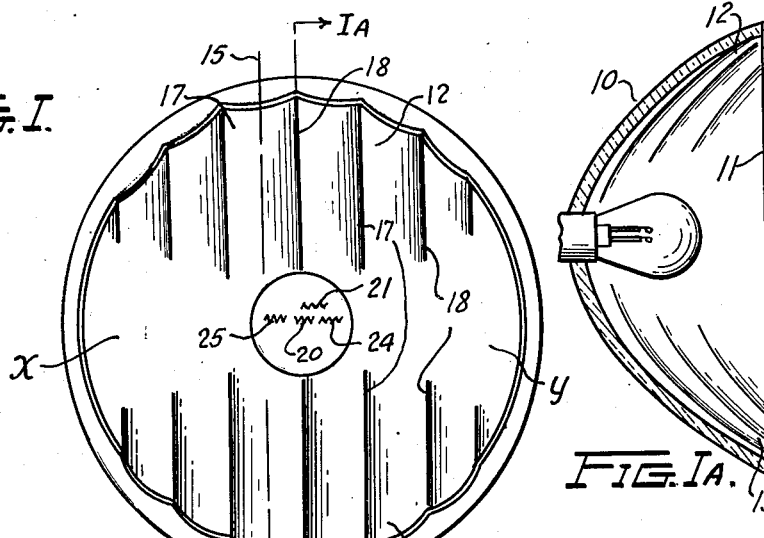
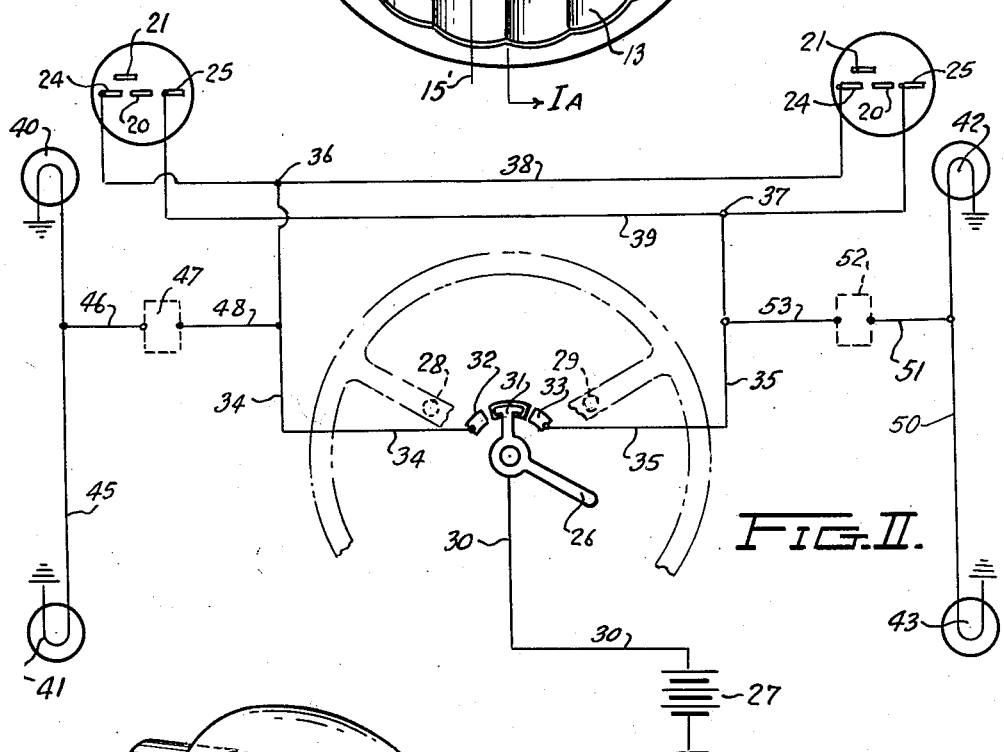
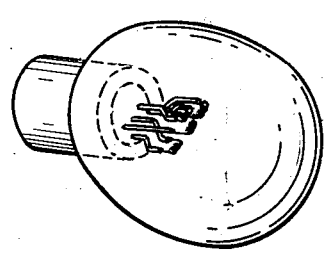
INVENTOR.
Guy H. Coulter
BY Edmund B Whitcomb
ATTORNEY

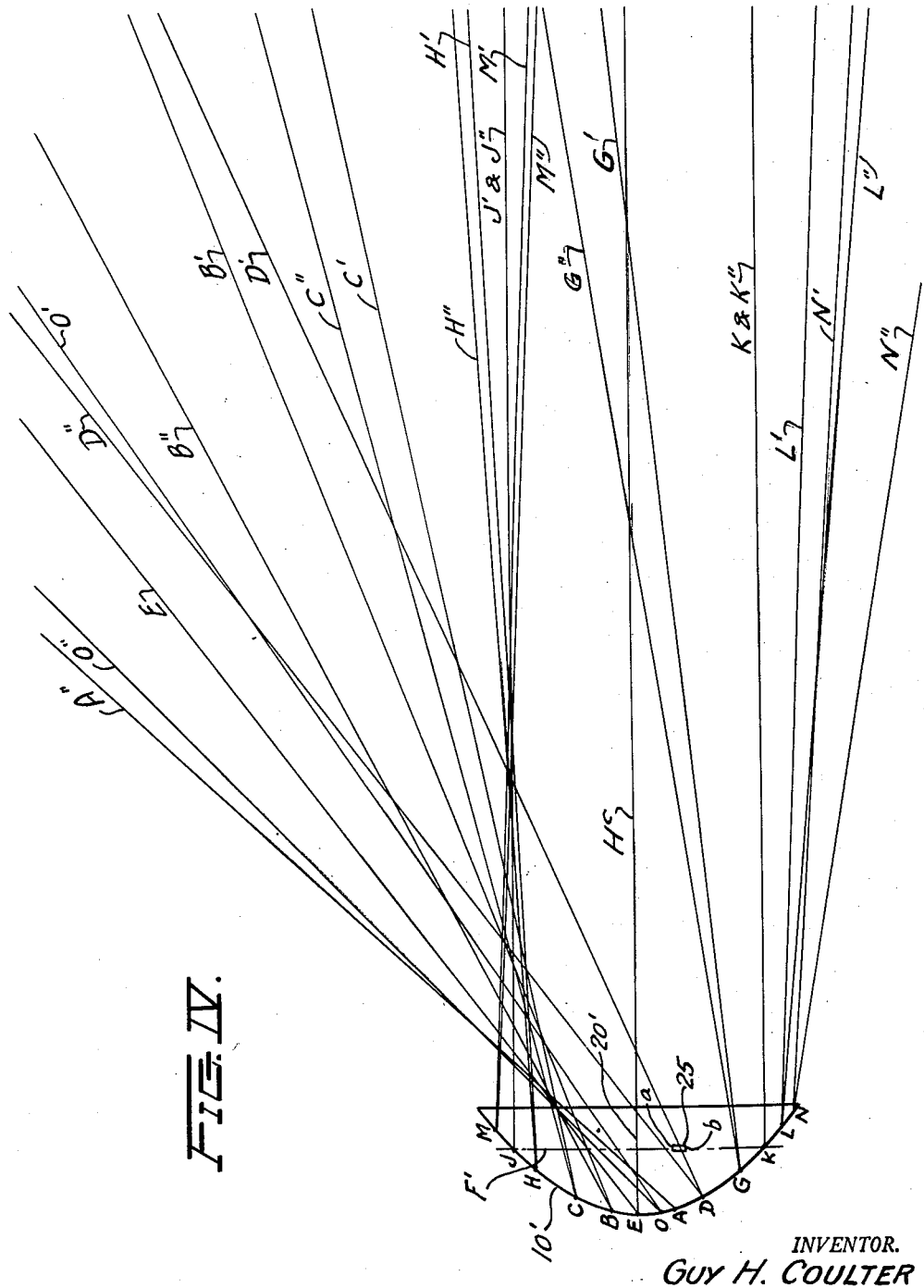

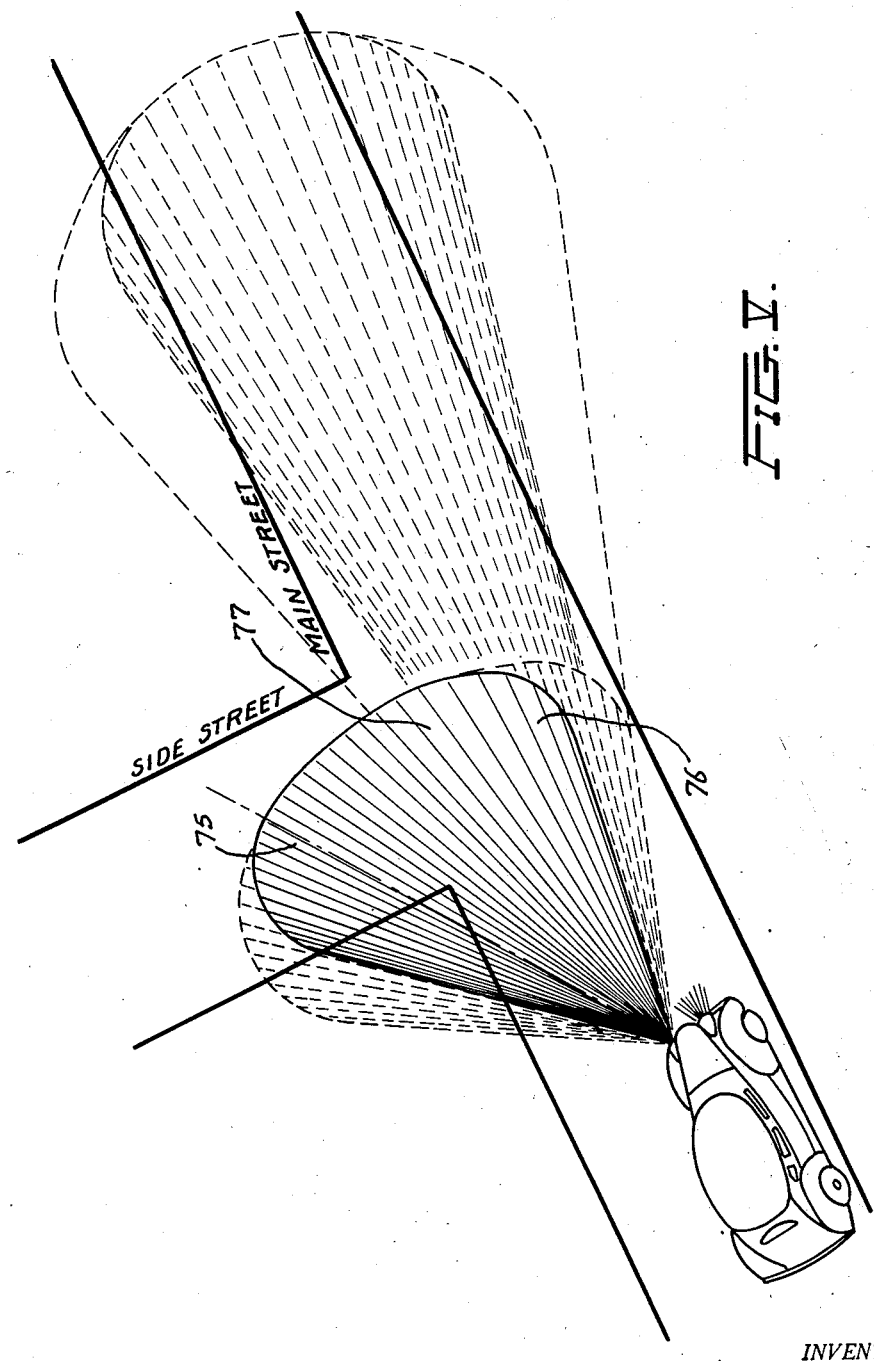

Patented Sept. 23, 1952

2,611,857

UNITED STATES PATENT OFFICE 2,611,857

COMBINED VEHICLE HEADLIGHTING AND TURN ILLUMINATING SYSTEM

Guy H. Coulter, Detroit, Mich., assignor, by mesne assignments, to The Electric Auto-Lite Company, Toledo, Ohio, a corporation of Ohio Original application May 8, 1947, Serial No. 746,726. Divided and this application August 11, 1948, Serial No. 43,676

3 Claims. (Cl. 240—41.25)

This invention relates to headlamp constructions together with a combination of circuits and operating controls with pilot indicating means to indicate the proper operation of the mechanism, and is a division of my copending application, Serial No. 746,726, filed May 8, 1947, issued into Patent No. 2,490,948 which in turn is a continuation in part of applications Serial No. 674,441, filed June 5, 1946, and Serial No. 452,521, filed July 27, 1942, issued into Patents 2,565,757 and 2,453,702 respectively, the invention contemplating means for projecting a satisfactory beam of light for the driver of a motor vehicle in turning curves in the country or making right hand and left hand turns in city streets.

One of the objects of the present invention is to provide a unique arrangement of filaments in an automobile headlamp so that the driver may, at will, energize filaments to give a beam pattern of light in rounding curves, either right hand or left hand, in the country and in making right hand or left hand turns for city driving, and to accomplish this without requiring any moving parts in the lamp other than the operation of the controlling switch by the driver. Moreover, by my invention, I am able to employ the ordinary headlamp arrangements for producing the normal driving beam and normal passing beam in which the component parts of the headlamp are provided with efficient and satisfactory means for facilitating the production of the required beams for normal driving in a cheap and economical manner, and by a construction which will avoid the formation of objectionable glare. An important feature of my invention is the special construction of the headlamp and particular location of filaments to greatly increase the efficiency for producing right hand or left hand turn beam patterns. I employ a type of headlamp using the reflector which may extend forward of the focal plane, so proportioned with the part of the reflector in back of the focal plane that with my filament arrangements I am able to produce the beam patterns for turning in right hand and left hand directions in such a manner as to also provide a certain amount of light on the road in the opposite direction with a much reduced intensity in the connecting arrangement of the beam so that when turning the vehicle in either direction, objectionable glare is eliminated for an oncoming vehicle but, at the same time, a desirable amount of light is thrown to distinguish objects on both sides of the street around the corner into which the vehicle is being guided.

In certain embodiments of my invention, I have found that I can use a headlight construction in which the front cover glass may be plain, unfluted and therefore provide for a maximum efficiency of light transmission, while I obtain the spreading action for vertical flutes located in the reflector itself. I also use a polarized light front cover. Moreover, I contemplate using a headlight construction in which a separate "miniature" bulb is employed as well as one in which the entire unit constitutes a bulb in itself, the same being exhausted of air and constituting a combined bulb and headlight incorporating therein the arrangement above specified.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure I illustrates a front elevation of one embodiment of my headlamp construction;

Figure II is a diagram viewed from the driver's seat showing the circuits for the filaments of the headlamp and also the combination with the flashing turn indicating system with a single control;

Figure III is a perspective of the miniature bulb used in the embodiment illustrated in Figure I;

Figure IV is a diagrammatic view showing geometrically the projection of rays from the turn filament illustrated in my several embodiments;

Figure V is a diagrammatic view showing the production of the beam pattern for straight-ahead driving and for left hand turning in a city street.

In one embodiment of my present invention, I employ in the upper half of the parabolic shaped, metal, glass, or molded plastic reflector 10, a series of curved flutes 12 convex in transverse configuration, while on the lower half the flutes 13 are reversed and made concave—viewed from the front. Thus, as shown in Figures I and I-A, I use a fluted glass reflector 10 and a plain glass front cover 11 suitably sealed or otherwise joined at their meeting edges.

This "plain" glass cover, I also make up with a polarized light material associated therewith to further avoid glare. In this connection, it is important to note that although "polarizing" reduces the light transmission efficiency of the glass, yet by eliminating all flutes and all prisms on the front cover, the loss due from such flutes and prisms is entirely avoided with a net result that even when "polarized," the front cover 11 in my headlamp combination is substantially as efficient in light transmitting properties as the ordinary front cover lenses having prisms and flutes therein. The upper half of the flute 12 is convexly shaped as indicated with the high spot or line as at 15 in Figure I. In this case the vertical configuration of each flute 12 and 13 is not modified from the true parabola at each separate flute lateral side edges 17 and 18. However, the central high portion or zone adjacent line 15 in the upper half of the reflector has the same effect in modifying the downward bending power of the reflector as compared with the true parabola, as if the curvature of the entire flute were modified from the true parabola to obtain a downward bending effect, and the low zone 15' on the lower half flute 13 also likewise cooperates with the upper half in this regard. Since a downward bending effect is also obtained in the lower half of the reflector by changing from a convex flute 12 at the upper half to a concave flute 13 at the lower half, the result produced is similar to that obtained by drawing down of the reflector from the true parabola. The spread laterally is obtained in addition to the use of "main" and "passing" bar or elongated bar type filaments 20 and 21 by the transverse convex or concave configuration of each flute.

In each of the embodiments of my invention illustrated herein, I use a separate "miniature" bulb as illustrated in Figures I, I-A, and III or I use the entire unit of the reflector 10 and front cover 11, properly sealed at its edges as a bulb of the "sealed beam" type.

The special location of the offset passing beam filament 21 not only throws the beam downwardly but directs it laterally to the right side of the road. However, some of the light, according to the optical law in relation to a parabola, particularly that in front of the focal plane emanating from the passing filament 21, instead of passing to the right is directed toward the left. An important feature of my invention is an arrangement illustrated in Figure I where it is seen that the flutes 12 and 13 disappear at the central zone which fans out on both sides from the central part as indicated at X and Y. By eliminating the spreading effect at these particular sections, I have found that it is possible to get the overall desired passing beam pattern in which, while some of the light is thrown to the left, the omission of spreading flutes at these points X and Y not only cuts off the additional spread which would otherwise occur, but also cooperates in producing my special type of right hand and left hand "turning" beams. In this way, I obtain the desired beam pattern with the substantial effect of throwing the "effective" passing beam down and to the right as desired.

In the embodiment illustrated in Figures I to III, I employ two additional separately energizable, laterally disposed filaments 24 and 25, which are located substantially on the horizontal axis of the reflector 10 and may be connected by the operator through switch 26 with a source of energy 27 when the motor vehicle is turning to the right hand or to the left hand. As shown in Figures I and III, the main driving beam filament 20 is located as nearly exactly at the focus of the parabolic reflector 10 as is possible, while the filament 21 is offset vertically and horizontally to throw the "passing" beam of light toward the right hand of the side of the road. It will be understood that in this embodiment for normal driving, the main filament 20 forms the source of the illumination for the main driving beam. When passing other vehicles the filament 21 is energized which throws the light, as heretofore stated, downwardly and toward the right hand side of the road. However, when it is desired to turn toward the right hand, the filament 24 is also energized by manipulation of switch 26, and this throws a substantial amount of light toward the right as the vehicle begins to turn and greatly facilitates right hand turning. On the other hand, if it is desired to turn to the left, the other filament 25 is energized and likewise a beam pattern having a large amount of light distributed toward the left is produced to facilitate left hand turning. The ray projection and special beam pattern is hereinafter more fully described in connection with Figures IV and V. The switch 26 connects the various "turn" filaments with a source of energy such as represented by battery 27. A pair of pivoted fingers 28 and 29 on the steering wheel automatically return the switch 26 to its normal position after a turn to the right or the left.

The circuits are shown in Figure II. A lead 30 connects the battery 27 to the main switch blade 31. A pair of stationary terminals 32 and 33 adapted to be selectively contacted by switch blade 31 are connected by leads 34 and 35 to junction points 36 and 37. A lead 38 connects point 36 with the right hand turn filament 24 of each headlamp and lead 39 connects junction point 37 with each left hand turn filament 25 as shown in Figure II.

The one control switch 26 also controls the directional signals 40, 41 on the left side of the vehicle, 40 at the front and 41 at the rear, while a pair of directional signals 42 and 43 are located on the right side of the vehicle. A common lead 45 connects signals 40 and 41, the lead 45 being connected by lead 46, flasher 47 and lead 48 to lead 34. On the other side, lead 50 connects the two signals 42 and 43, and this lead 50 is in turn connected through lead 51, flasher 52 and lead 53 to lead 35. By this arrangement, the single switch 26 simultaneously controls both the directional signal system (filaments 40, 41 and 42, 43) and headlamp turn beam producing filaments 24 and 25.

In Figure IV, I have illustrated an accurately drawn projecting diagram for rays emanating from an offset source of energy such as the filament 25 with a geometrically correct parabola 10' drawn as accurately as possible, the parabola 10' representing the reflecting surface of portions of the reflector 10. The lines on the diagram of Figure IV were plotted in accordance with the law of optics of light reflection, i. e., that the angle of incidence equals the angle of reflection. Thus, the "normal" for any point on the horizontal parabola 10' through focus 20' was ascertained by bisecting the angle between a line from the focus 20' to point on the reflector 10' and a horizontal line parallel to the main horizontal axis H—C which a ray of light would take; according to the optical operation of a paraboloidal surface such as indicated at 10'.

Thus, the "normal" for any point such as at O on the parabola 10' was ascertained by bisecting the angle between a line drawn from the focus 20' and the forwardly projected horizontal line which is parallel to the main horizontal axis Hc of the reflector. According to the optical operation of a parabola, a ray of light emanating from a "point" source as at the exact focus F would be projected parallel with the axis of the reflector. Having ascertained the normal at point O, then in order to ascertain where the rays would be projected from the offset filament 25 (for example) the following procedure was carried out in Figure IV: a series of lines were drawn from a pin point source of light assumed to be located at one end 25A of the bar reflector 25, while another series of lines were drawn as coming from a source of light located at the other extreme end 25b of said bar filament. In this way, I obtain an over-all effect of the maximum and minimum angle of spread for the rays due to a horizontally arranged bar offset filament 25. Specifically, a line was drawn from point 25a to point O and the angle ascertained between such line and the "normal" for point O, said "normal" having been obtained as above specified. This is the angle of incidence. The angle of reflection was then measured off and the line O' was drawn representing the ray of light projected from point I emanating from 25a.

The procedure was repeated as to point 25b at the other end of the bar filament and a line drawn from a point 25b to O. The angle of incidence to the normal was ascertained and then the line O" drawn on Figure IV.

A similar procedure was repeated for the several points A, B, C, D, G and H, all located in the rear of the focal plane of the reflector represented by the line F'. In this way a fanning out of the light spread to the left is clearly indicated by the variation in the projected angle for the rays, as for example, from the ray G—G' which shows a relatively small amount of deflection to the ray A—A'', which was diverted by a maximum angle to the left, as shown on the plot of Figure IV.

In my invention, I utilize an important and unusual phenomena in connection with ray projections from a parabola, namely, that for an offset filament such as the filament 25, certain rays of light projected from that part of the reflector in front of the focal plane F' instead of being diverted toward the left (as in the case of the rays of light above referred to) these latter rays emanating from in front of the focal plane F' are diverted in an opposite direction, i. e., slightly to the right, while, of course, rays emanating from any point exactly on the intersection between the focal plane F' and the parabola 10' are projected horizontally and parallel to the axis Hc. I have specifically plotted points L, M and N, which points are located in front of the focal plane F' and followed the procedure described above in locating the ray projection for the light from these particular points L, M and N. In this way, I found the line N—N'' directed the most toward the right, while the other rays L—L', M—M' and N—N', et cetera are also directed to the right but to a lesser degree.

Moreover, I arrange the focal length of the reflector compared to the diameter of the front opening that less angles of deflection and less total light flux is thus projected to the right in such instance—where the main flux is to the left for a left hand turn. As a result the area between these two extremes, the left hand and right end portion of the light pattern is of greatly reduced flux at this central area. For example, I have ascertained that between the ratios of one unit of focal length to eight for the diameter of the front opening of the parabola as one extreme and one unit focal length to four for such diameter of the front opening as the other extreme are satisfactory for the purposes of my invention, but preferably nearer the one to four ratio than one to eight ratio. The dotted lines in Figure V associated with the left hand turn projected beam indicate the added effect obtained by the spreading flutes 12 and 13 of the reflector.

An important feature of my invention is the fact that I utilize, as stated above, this unusual feature in a paraboloidal headlamp that while the main light flux is diverted to one side (as at 75 in Figure V), nevertheless a substantial amount is projected to the opposite side in producing beams of light from filaments located substantially off the mathematical focus of the paraboloid. Figure V illustrates this more fully. The main portion of, or a certain amount of the light flux shown as at 75, goes to the left and forms the main portion of the left turn pattern while that portion 76 emanating from that portion of the paraboloid in front of the focal plane F', when the offset filament 25 is energized instead of being sharply projected toward the left as at 75 is slightly projected toward the right as at 76 and is of less flux than at 75. The total available light flux in the entire beam pattern is thinned out at the central area 77 of the pattern connecting that portion of the main turning beam 75 which is thrown to the left. In view of the fact that an oncoming automobile would be approaching into this zone (area 77) and the light intensity in this area 77 is greatly reduced, the glare in the eyes of the oncoming driver is thereby substantially eliminated.

In connection with the safety feature of my invention, assuming the condition of making a left hand curve on the country driving, if there is no approaching car on the curve, then the operater would use the shift over beam for the left hand turn. However, if there is an oncoming car around the curve, the other car would light up the roadway on that side, it would be unnecessary for the driver to throw on his curveturn beam when the curve is to the left.

If the curve is to the right, the operator would use it with no problem of turning his headlights into the oncoming driver's eyes because the operator would be turning the beam pattern clear around to the right and this would correspond to using the depressed beam, broadly, in so far as avoiding glare in the eyes of the oncoming driver is concerned. There would be less glare on the right hand turn because the total amount of flux differs compared with the straight way beam for the filament at focus, namely, the part of the light from the rear of the focal plane is pulled around to the right, whereas some of the other light in front of the focal plane goes almost straight ahead and is pulled over to the left slightly, but the light intensity by this action is reduced which tends to reduce the objectionable glare.

It is apparent that, within the scope of the invention, modifications and different arrangements may be made other than is herein disclosed, and the present disclosure is illustrative merely, the invention comprehending all variations thereof.

What I claim is:

1. In a combined head-lighting and vehicle turn illuminating system; a pair of headlamps adapted to project distinctive light beam patterns by the simultaneous energization of similarly positioned filaments in said pair of headlamps, each of said headlamps comprising a parabolic reflector; a main filament located substantially at the focus of said parabola for producing a main driving beam; a separately operable passing beam filament located above and laterally offset to the left to produce a passing beam directed toward the right and depressed downwardly from said main beam; a pair of separately energizable auxiliary filaments for producing right-hand turn and left-hand turn beams of light conjointly with said main or passing beams, said auxiliary filaments being horizontally arranged, one on the right-hand side and one on the left-hand side of said main filament, each located in the main horizontal plane of the headlamp passing through the focus of the parabola; and optical means formed on the reflector including vertically arranged and transversely curved flutes, the transverse curvature of the flutes flattening out at the central section of the reflector to conform substantially to its parabola without forming terminal intersection surfaces and increasing therefrom so that the central portion of the flutes is located below the reflector parabola at the top and bottom portions for spreading laterally and directing downwardly certain rays of light in the beam pattern produced by each of said filaments.

2. In a combined vehicle head-lighting and turn illuminating system; a pair of headlamps forwardly directed and laterally spaced, said headlamps having a plurality of separable filaments for producing distinctive beam patterns by the simultaneous energization of the similarly positioned filaments; each of said headlamps comprising a parabolic reflector; a main filament located substantially at the focus of said parabola for producing a main driving beam; a separately operable passing beam filament located above and laterally offset to the left to produce a passing beam directed toward the right and depressed downwardly from said main beam; a pair of separately energizable auxiliary filaments for producing right-hand turn and left-hand turn beams of light, said auxiliary filaments being horizontally arranged, one on the right-hand side and one on the left-hand side of said main filament; and vertically disposed narrow curved zones formed on the reflector, the lateral edges of the zones conforming substantially to the parabola of the reflector, the central portion of the curved zones gradually flattening out at the central section of the reflector to conform substantially to its parabola without forming terminal intersection surfaces and the said central portion of the curved zones being of maximum curvature at the top and bottom edges of the reflector for spreading laterally and directing downwardly certain rays of light in the beam pattern produced by each of said filaments, said turn beam patterns including a relatively high flux density at the extreme side of the produced turn beam pattern, said pattern also extending slightly to the left for a right-hand turn and to the right for a left-hand turn, the central area of said pattern connecting the extreme outside areas of said patterns being of greatly reduced light flux density.

3. In a combined head-lighting and vehicle turn illuminating system; a pair of headlamps forwardly directed and placed at each side of the vehicle, said pair of headlamps comprising separably energizable filaments for producing distinctive light beam patterns by the simultaneous energization of the similarly positioned filaments in said pair of headlamps, each of said headlamps comprising a parabolic reflector; a main filament located substantially at the focus of said parabola for producing a main driving beam; a separately operable passing beam filament located above and laterally offset to the left to produce a passing beam directed toward the right and depressed downwardly from said main beam; a pair of separately energizable auxiliary filaments for producing right-hand turn and left-hand turn beams of light, said auxiliary filaments being horizontally arranged, one on the right-hand side and one on the left-hand side of said main filament, each located in the main horizontal plane of the headlamp passing through the focus of the parabola; and vertically disposed narrow zones transversely curved formed on the reflector, the central portion of the curved zones gradually flattening out at the central section of the reflector to conform substantially to its parabola without forming terminal intersection surfaces and shaped convexly at its upper half and concavely at the lower half and the said central portion of the curved zone having maximum curvature at the top and bottom edges of the reflector for spreading laterally and directing downwardly certain rays of light in the beam pattern produced by each of said filaments; and a polarized filmed glass cover at the front of said reflector.

GUY H. COULTER.

REFERENCES CITED

The following references are of record in the file of this patent:

UNITED STATES PATENTS

| Number | Name | Date |
|---|---|---|
| 1,566,906 | Mattisse et al. | Dec. 22, 1925 |
| 1,653,142 | Zorger | Dec. 20, 1927 |
| 1,793,662 | Wood | Feb. 24, 1931 |
| 1,796,530 | Melish | Mar. 17, 1931 |
| 1,859,854 | Wallstab | May 21, 1932 |
| 2,031,045 | Land | Feb. 18, 1936 |
| 2,099,694 | Land | Nov. 23, 1937 |
| 2,146,593 | Roper | Feb. 7, 1939 |

FOREIGN PATENTS

| Number | Country | Date |
|---|---|---|
| 332,458 | England | July 24, 1930 |